J. CLARK.
WROUGHT METAL RING FOR COLLAR CLAMPS, &c.
APPLICATION FILED DEC. 30, 1912.
1,062,438.
Patented May 20, 1913.
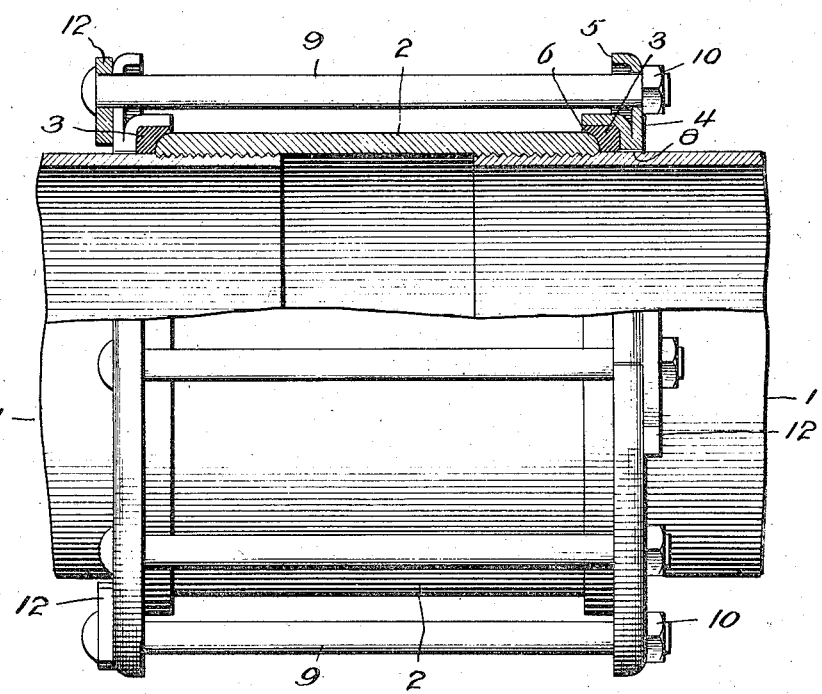
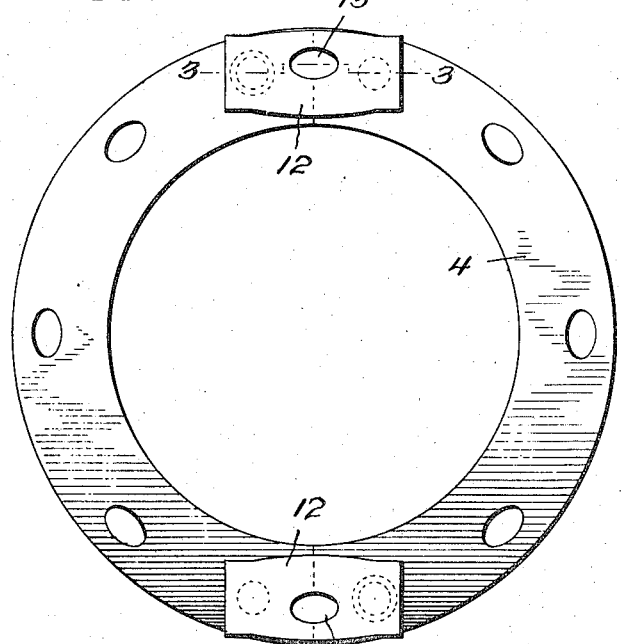
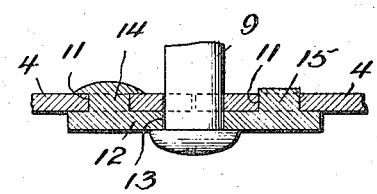
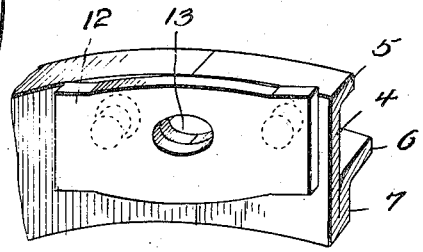

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA.

WROUGHT-METAL RING FOR COLLAR-CLAMPS, &c.

1,062,438.          Specification of Letters Patent.        Patented May 20, 1913.

Application filed December 30, 1912. Serial No. 739,401.

*To all whom it may concern:*

Be it known that I, JAMES CLARK, citizen of the United States, residing at Bradford, in the county of McKean and State of Pennsylvania, have invented certain new and useful Improvements in Wrought-Metal Rings for Collar-Clamps, &c.; and I do hereby declare the following to be a full, clear, and exact description of the invention, such as will enable others skilled in the art to which it appertains to make and use the same.

My invention consists in the novel features hereinafter described reference being had to the accompanying drawing which shows an embodiment of the invention selected by me for purposes of illustration, and the said invention is fully disclosed in the following description and claims.

Referring to the said drawing, Figure 1 represents a side elevation partly in section of two screw threaded pipe sections connected by the ordinary screw collar, and having applied thereto a collar clamp for preventing the leakage of the joint, the clamping rings of which embody my invention. Fig. 2 is an elevation of one of said rings looking at the outer face of the same. Fig. 3 is an enlarged sectional view on line 3—3 of Fig. 2. Fig. 4 is a detail perspective view partly in section of a portion of one of said rings and showing one of the bridge pieces for uniting the sections of the ring.

The object of my invention is to produce a strong and economical divided ring of wrought metal suitable for use in a collar clamp for stopping leaky joints in pipe lines, and for other purposes. Divided rings are ordinarily used in connection with pipe lines already laid, and the rings are made in sections, usually two sections, to facilitate placing them around the pipe sections, without loosening the joint.

In Fig. 1, I have shown my invention embodied in a collar clamp adapted to stop the leakage of screw collar joints in pipe lines. In said Fig. 1, 1 represent the pipe sections, the meeting ends of which are threaded and are screwed into the ordinary screw collar 2. In case such joints leak a collar clamp is applied to it comprising rubber gaskets (as 3) to be applied at each end of the collar, (said gaskets being cut to permit them to be placed around the pipe sections), two rings surrounding the pipe sections, for compressing the gaskets, and connecting bolts and nuts for drawing the rings together upon the gaskets. The divided rings for this purpose have ordinarily been made of cast iron, with overlapping end portions, or other means for uniting the sections thereof but such rings are liable to crack or break and it is not possible to obtain anything like close joints between the sections of a cast ring on account of the roughness of the cast metal and the necessity for allowing therefor at such joints. The object of my invention is to produce a divided ring of wrought metal, which when the sections thereof are united will be substantially like an integral ring in form and strength, and in the smoothness of the wall of its packing recess, with practically perfect joints at the points where the ends of the ring section come together. Such rings I have shown in the drawings, constructed in the form which I prefer to employ, each ring having an annular plate member 4, provided at its outer peripheral edge with a reinforcing flange 5, and having an annular flange member 6 projecting from one face of the plate member, said flange member having the portion 7 nearest the plate member bent inwardly and united to the plate member at the inner edge thereof, to form a cylindrical wall 8 which forms the pipe aperture of the ring. The plate member is provided with an annular series of bolt holes to receive the connecting bolts 9 which with their nuts 10 draw the rings together upon the packings. I prefer to form the rings from a flat annular blank of sheet metal or other wrought metal, for example, boiler plate, by pressing the blank into shape by means of suitable dies, but I do not limit myself to this method of manufacture nor to the exact details of the ring. The ring is preferably made in one piece, however produced, and is then sawed or otherwise divided into sections, preferably halves, on a line passing through opposite bolt holes in the plate member in such manner that the adjacent surfaces of the plate member and flange member on opposite sides of the line of separation are practically continuous when the ends of the sections are brought together. The plate member is also provided either before or after being divided, with apertures 11, 11 at opposite sides of the bolt holes through which the line of division is to pass, or has passed. In order to hold the sections of the ring together when in use I provide bridge pieces 12, 12, provided each with a central bolt hole 13, to register with the bolt hole formed at the junction of the ring sections and having two integral locking studs 14, 15 projecting from one face of the bridge piece to enter and fit the holes 11, 11, in the plate member, thus connecting the ring sections and affording a proper bearing for the head or nut of one of the connecting bolts, as shown. In order to facilitate placing the ring sections around the pipe and connecting them, and to prevent the bridge pieces from becoming mislaid or lost in transit or in the field, I prefer to secure one bridge piece permanently to each ring section (or obviously both bridge pieces could be secured to one of the ring sections, if desired) by upsetting one of the lugs (the lug 14 as shown) and thereby securing one end of the bridge piece rigidly and permanently to the adjacent ring section.

It will be noted that as the ring sections fit perfectly at their meeting ends, the lugs 14 and 15 can be made to fit their respective apertures very snugly and accurately without rendering it difficult to assemble the ring sections around the pipe, and when the ring sections are placed in operative position with the lugs 15 in the proper holes 11 and the connecting bolts are drawn up, the rings will be practically as rigid and strong as if they had not been divided, and the inner face of the packing recess will be perfectly smooth and uniform throughout, the fine crack at the union of the sections being practically imperceptible and being too slight to affect the action of the ring in compressing the rubber. It will also be noted that the bridge piece being formed with integral studs, and being preferably stamped up by a single stroke of a die press, from a bar or blank of the required size and thickness, the use of bolts and nuts to secure the bridge piece to the ring sections, is dispensed with, and the bridge piece can, therefore be made much shorter than it could if bolts were used, as bolts would have to be spaced at such distances from the connecting bolt 9, as would permit the use of wrenches in tightening up the nuts.

The connecting bolts 9 are provided with what are called "track heads" the shank beneath the head being of ellipsoidal shape and the bolt holes in the plate member, and the bolt holes 13 in the bridge pieces are of like shape, that is to say having unequal diameters so that all of the bolts, including those passing through the bridge pieces are held from turning while their nuts are screwed up, by the engagement of the track heads with the bolt holes. The bolts which pass through the apertures in the bridge pieces will be held from turning by the bridge pieces themselves, thus relieving the bolt engaging recesses in the ends of the ring sections and the locking studs, from the torsional strain of the track head bolts which would tend to separate the ring sections and interfere with the proper assembling of the clamp.

In placing the rings around the pipe at opposite ends of a screw collar, where the rings are employed in a collar clamp, the line of division of one ring may be placed at right angles to the line of division of the other ring, as shown in Fig. 1, but this is not essential.

What I claim and desire to secure by Letters Patent is:—

1. A divided ring for collar clamps and the like formed of wrought metal and comprising an annular plate member provided with bolt holes and an annular portion projecting from one face of the plate member, said rings being formed in sections separated on a line passing through bolt holes in the plate members, said sections having plane meeting ends accurately fitted, so as to make the adjacent surfaces of adjacent sections continuous, the plate member portions of said sections being provided with locking apertures adjacent to their ends, and bridge pieces formed of wrought metal and provided with a central bolt hole, and having integral lugs projecting from one face to fit the locking apertures of adjacent sections and maintain the meeting ends thereof in fitted relation.

2. A divided ring for collar clamps and the like formed of wrought metal and comprising an annular plate member provided with bolt holes and an annular portion projecting from one face of the plate member, said rings being formed in sections separated on a line passing through bolt holes in the plate members, the said sections being divided parts of an integrally formed ring and having their meeting end faces smooth and close fitting to secure substantial continuity of surface from one section to another, said sections being provided with locking apertures adjacent to their ends, and bridge pieces formed of wrought metal and provided with a central bolt hole and having integral lugs projecting from one face to fit said locking apertures and hold the meeting ends of said sections in fitted relation.

3. A divided ring for collar clamps and the like formed of wrought metal and comprising an annular plate member provided with bolt holes and an annular portion projecting from one face of the plate member, said rings being formed in sections separated on a line passing through bolt holes in the plate members, said sections having plane meeting ends accurately fitted, so as to make the adjacent surfaces of adjacent sections continuous, the plate member portions of said sections being provided with locking apertures adjacent to their ends, and bridge pieces formed of wrought metal and provided with a central bolt hole having unequal diameters to hold the bolt head from rotation and relieve the ends of the sections from lateral strain, and having integral lugs projecting from one face to fit the locking apertures of adjacent sections and maintain the meeting edges of the sections in fitted relation.

4. A bridge piece for connecting the sections of a divided ring formed of wrought metal and comprising a plate provided with a bolt hole and with integral lugs projecting from one face of the plate and located on opposite sides of the bolt hole, to engage locking apertures in the plate member portions of the ring sections whereby the sections may be rigidly united and the use of bolts and rivets dispensed with.

In testimony whereof I affix my signature, in the presence of two witnesses.

JAMES CLARK.

Witnesses:
M. E. CLARK,
H. M. WICK.